1282X
R. U. & M. Richards,
Harness Tool.
Patented Apr. 24, 1810.
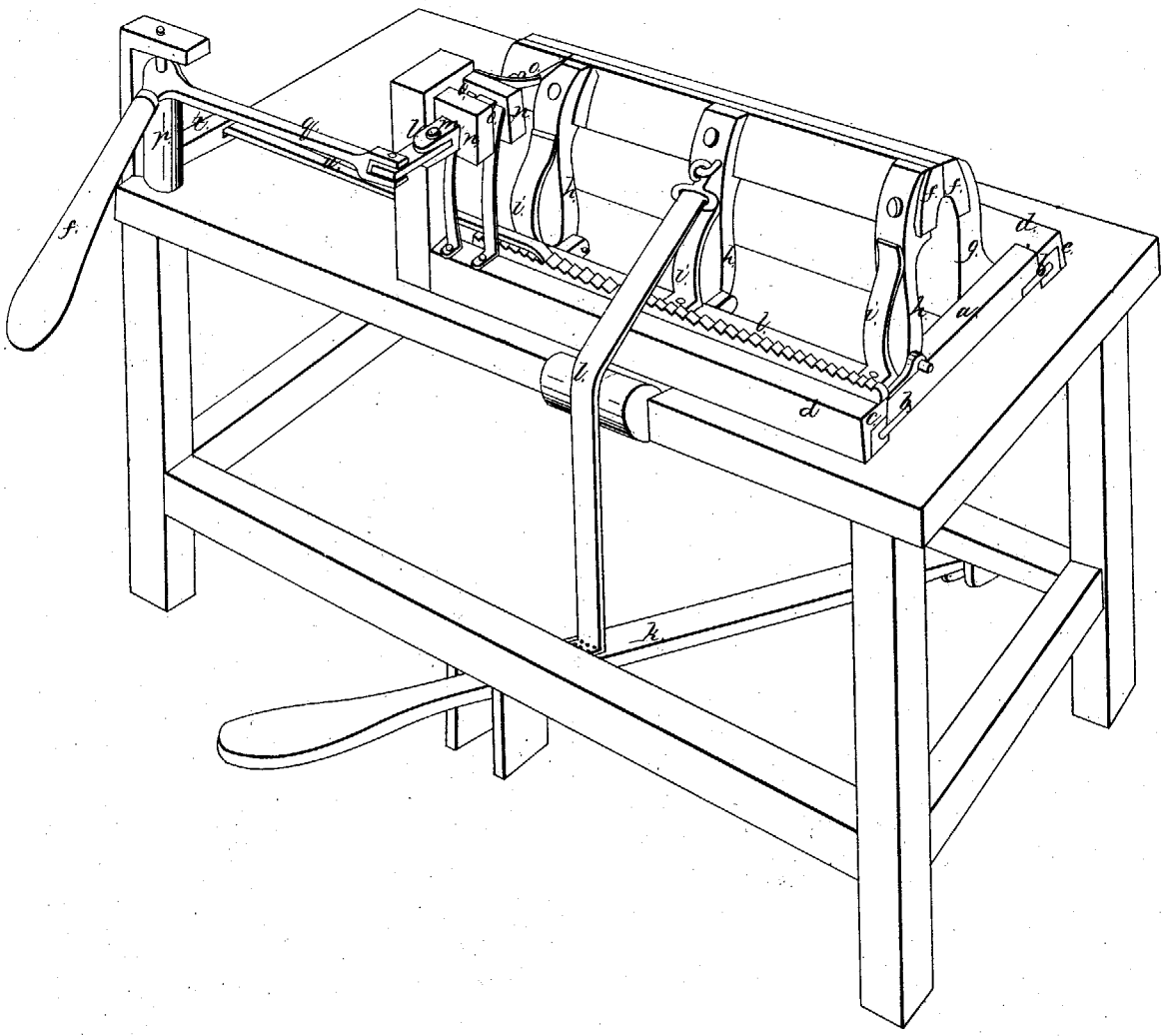
N. PETERS PHOTO-LITHOGRAPHER, WASHINGTON, D. C.

Robert W. Richards & Mills Richards
Letters Patent 1282X

The Schedule referred to in these Letters Patent and making part of the same containing a description in the words of the said Robert W. Richards and Mills Richards themselves of a machine for pricking Leather that is to be stitched

---

The frame or Bench is two feet and a half high, two feet and a half wide, and three feet and four inches long. This frame would be more convenient for a Shoemaker without legs or posts, for then he can place it on his cutting table, therefore it will be more convenient and less cumbersome. The carriage consisting of a frame of wood, eighteen inches long and ten wide, the running part of said carriage is iron or steel fastened to the under side of the carriage, which irons run through ten steel or cast iron boxes, five each side these boxes are fastened in two sticks of timber lying each side of said carriage the timber framed to the bench. On the abovemention-ed Carriage on the right side is fastened two or three rags or gages made of steel with the notches upward. The clamps which are fastened on the upper side of said Carriage and are seven inches high and eighteen inches long made of wrought or cast iron in two parts, one part of said clamps is made fast on the left side of said Carriage by a curved piece of timber the same length of the clamps, the other part or side of clamps which is fixed to open, has at the bottom three iron gudgeons turning in boxes which boxes are fastened in the Carriage. the lower part or bottom of the clamps are four inches apart, the side bars which are up and down are bent in order to bring the top bar or jaws together for the purpose of holding the leather. The clamps are shut with three steel springs set in the carriage and rest against the side bar of the clamps that opens. Clamps open by putting the right foot on a treadle fastened at the right side of the bench, from the treadle is a strap which goes over the roller on the right side of the bench and reaches to the Clamps with an iron hook on the end which hook hooks to the middle bar of said clamps. These clamps are hung in such a manner that they can be taken out after the leather is prick-ed and set on other benches and sewed up. therefore we deem it necessary if the business of the shop requires it to have a number of pairs of clamps fitted to run in one

[illegible] 1282X one Machine of the same size and description as above specified. The awl bar
bar is nine inches long, and five eighths of an inch square made of steel, in the end
next to the clamps is a screw box for the purpose of screwing in awl hafts, in the oth-
er end of this bar is a crotch with a hole through it for a pin. said bar slips through
two boxes which boxes are fastened in a block of wood. the awl bar is guided by three
springs on the underside of the bar between the boxes fastened to the block the other
two springs are set in the block and stand upright and rest against the side of the
bar, the block is fastened. The right side to the clamps in two holes which posts
are framed on the centre of the bench. the posts sufficient in height to raise the awl
bar to the height of the clamps. The needle post or roller is nine inches long and
stands perpendicular turning in two steel boxes, one at the bottom and the other
at the top, which boxes are fastened in a post which post is framed in the further
end of the bench. the needle bar is two feet long including the elbow, and is
fastened to the upper end of the roller and reaches to the awl bar and there has
a mortice for a sheath or piece of iron, which sheath is fastened in the mortice
with a pin the other end of the sheath is fastened in the crotch of the awl bar with
a steel pin, in the end of the needle bar is a handle of wood for the purpose of put-
ting the machine in motion by the hand. We conceive that the awl may be car-
ried by the foot by having a treadle and strap to carry it forward and a weight
or spring to carry it back. At the bottom of the roller is fastened an arm
which arm reaches to the left five inches, made square of iron. on said arm slips
a box or double swivel of iron, which box slips on and off to give the different
length of stitches, which box is fastened with a wedge or screw. The hand is
eighteen inches long one end is fastened to the box or double swivel with a steel
pin, the other end reaches under the awl and rests on the rag irons or gauges
for the purpose of moving said carriage and clamps. The awls are fixed
in a number of Awl-hafts which awl hafts are to be screwed in or out of the awl
bars as the business requires. The above mentioned machine can be varied larger
or smaller with the same proportion above specified. We conceive that this ma-
chine can be varied in several ways, the carriage can be moved with a screw
Exd. Drag and likewise the clamps made fast and the awl fixed on the carriage
[illegible] and moving in the like manner as the clamps Witnesses. Augustus Pettibone
Emmick Robbins
Ezekiel [illegible]

Robert W. Richards
Mills Richards

[illegible] 1054 [illegible]

[illegible] March 18[illegible]